United States Patent [19]
Farr

[11] 3,879,946
[45] Apr. 29, 1975

[54] BRAKE FAILURE INDICATOR
[75] Inventor: Glyn Phillip Reginald Farr, Kenilworth, England
[73] Assignee: Girling Limited, Birmingham, England
[22] Filed: Nov. 28, 1973
[21] Appl. No.: 419,663

[30] Foreign Application Priority Data
Nov. 30, 1972 United Kingdom............ 55397/72
Dec. 30, 1972 United Kingdom............ 60278/72

[52] U.S. Cl............................ 60/535; 200/82
[51] Int. Cl................................... F15b 7/00
[58] Field of Search................ 60/535, 534, 561; 200/82 D; 340/52

[56] References Cited
UNITED STATES PATENTS
3,412,557  11/1968  Williams.................... 60/535
3,602,883  8/1971   Belait....................... 200/82 D
3,606,486  9/1971   Doerfler..................... 60/535
3,622,972  11/1971  Herceg...................... 200/82 D
3,715,538  2/1973   Ito.......................... 200/82 D Primary Examiner—Martin P. Schwadron
Assistant Examiner—H. Burks, Sr.
Attorney, Agent, or Firm—Scrivener Parker Scrivener and Clarke

[57] ABSTRACT

A brake failure indicator comprises a piston having opposite ends exposed to the pressure in two hydraulic braking circuits, a ball located in a groove around the piston, a switch operated by radial movement of the ball caused by limited axial movement of the piston, and a self-energising indicating circuit operated by the switch.

6 Claims, 3 Drawing Figures

BRAKE FAILURE INDICATOR

This invention relates to means for detecting a difference in pressure between two hydraulic circuits, inparticular two brake circuits in any hydraulic braking system, said detecting means being of the kind in which opposite ends of a piston are adapted to be exposed to pressure applied to the two circuits and an actuating member for indicating means engages the piston, axial movement of the piston causing the actuating member to actuate the indicating means.

In known detecting means of this kind the actuating member is displaced from a groove in the piston to actuate the indicating means.

According to this invention in detecting means of the kind set forth axial movement of the piston is limited to prevent the actuating member from being displaced from the groove.

An advantage of this arrangement is that the piston can be arranged to be self-centering, the actuating member being returned to its normal position when the differential pressure no longer acts on the piston.

Preferably the actuating member is a spring-loaded ball co-operating with a groove in the piston.

The separate brake circuits may be supplied with fluid under pressure from separate master cylinders which are adapted to be actuated simultaneously, or from separate pressure spaces of a single master cylinder or master cylinder assembly, and each master cylinder or pressure space is supplied with fluid from an hydrostatic reservoir or from a source of fluid under pressure, for example a pump or hydraulic accumulator.

According to another aspect of this invention indicating means included in detecting means of the kind set forth comprises an electrical switch which is operated by the actuating member and is connected in a self-energising indicating circuit.

Thus operation of the switch energises the indicating circuit which remains energised irrespective of subsequent operations of the switch.

Preferably the indicating circuit includes a manual reset switch.

Examples of detecting means according to this invention are illustrated in the accompanying drawings in which.

Figure 1:
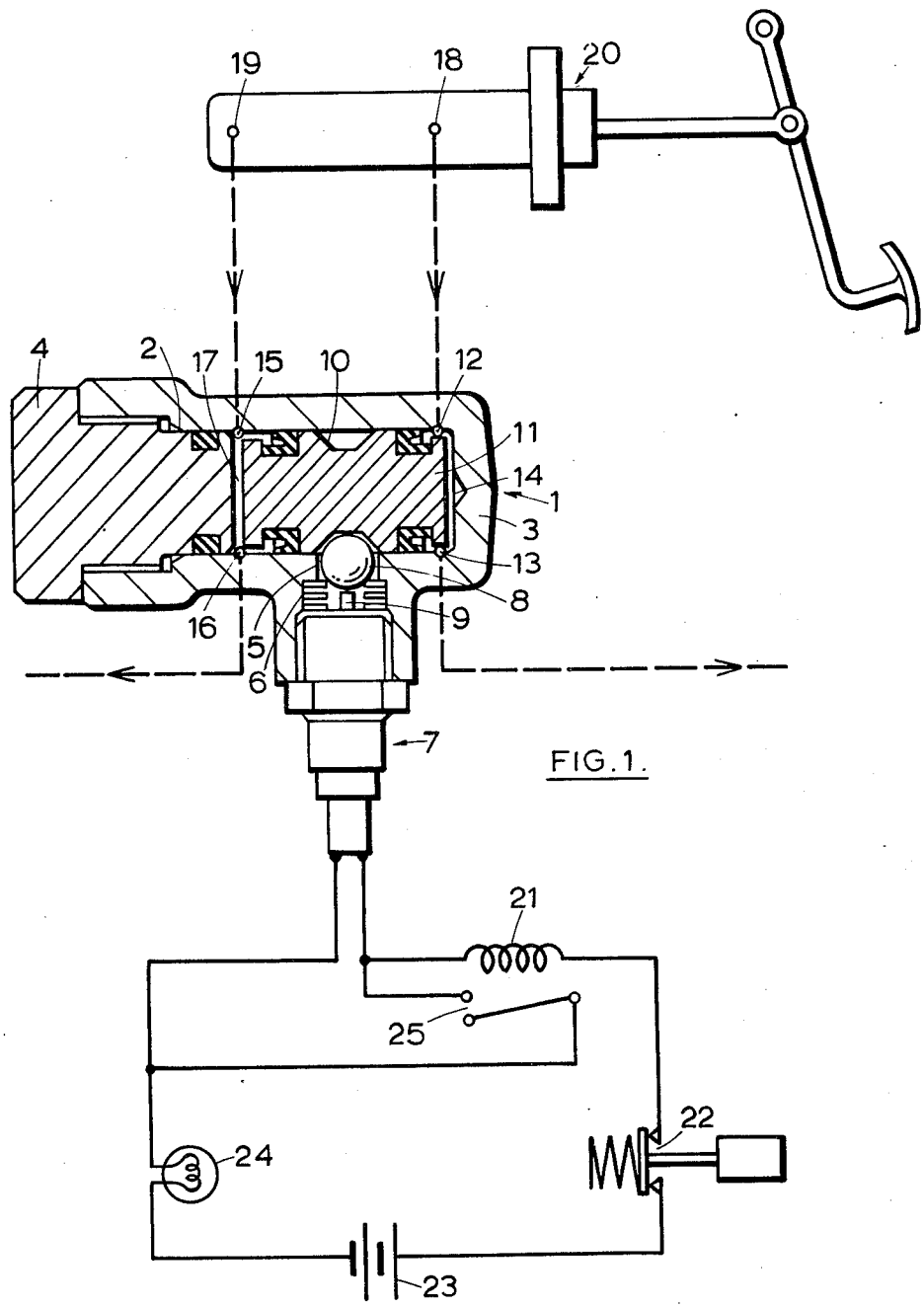
FIG. 1 shows a detector unit and electrical indicating circuit.

In FIG. 1 a differential pressure detecting unit comprises a housing 1 formed with a cylindrical axial bore 2 which is closed at one end by an end wall 3 and at the other end by a plug 4 screwed into the open end of the bore. A radial passage 5 in the wall of the housing 1 and leading into the bore 2 is located midway between the end wall 3 and the plug 4. The outer end of the passage 5 is counterbored at 6 to receive an electrical switch 7.

A ball 8 of diameter greater than the radial length of the passage 5 is guided in the passage 5. The ball 8 projects into the counterbore 6 to engage a spring-loaded member 9 of the switch 7 and it also projects into the bore 2 where it is received in a peripheral groove 10 around a piston 11 sealed at both ends in bore 2. The width of the groove 10 at the surface of the piston is substantially equal to the diameter of the ball 8 and the groove has oppositely inclined sides which, when the groove is aligned with the passage 5, are substantially tangential to the surface of the ball 8. The length of the piston 11 is such that, when the groove 10 is aligned with the passage 5, the ends of the piston are spaced by equal distances from the end wall 3 and plug 4, each distance being less than the radius of ball 8. Thus the axial movement of the piston is limited to retain the ball, at least partially, in the groove at all times.

Two ports 12, 13 in housing 1 lead into a first chamber 14 between the piston and end wall 3 and a further two ports 15, 16 lead into a second chamber 17 between the piston and plug 4. Inlet ports 12, 15 are adapted to connect the first and second chambers to outlets 18, 19 from the first and second pressure spaces of a tandem master cylinder 20, and the outlet ports 13, 16 are adapted to connect the chambers to first and second brake citcuits (not shown) of an hydraulic braking system of a vehicle.

In a normal application of the brake the pressure of fluid applied to the two brake circuits is substantially the same so that equal pressures in chambers 14 and 17 are acting on opposite ends of the piston 11 and the groove 10 is aligned with passage 5. In this normal position the ball 8 does not extend a sufficient distance into counterbore 6 to actuate switch member 9 of switch 7 which is normally open. In the event of failure of one of the brake circuits or a leak in one of the circuits a differential pressure will be exerted on the piston which will be moved axially to abut either the plug or the end wall. This movement will cause the ball to ride up one of the inclined surfaces of the groove and be guided by the passage 5 further into the counterbore 6, actuating the switch member 9 to close the switch 7. When the brake application is terminated or when the pressure leak is corrected the piston is centralised by the spring-loaded ball and the ball resumes its normal central position in the groove, allowing the switch 7 to re-open. Because the ball is not displaced from the groove it is able to centralise the piston even if there is no fluid pressure at either end of the piston.

The switch 7 is connected into an indicating circuit comprising a coil 21, a push-button reset switch 22, a battery 23 and an indicating light 24 or other warning device. A reed switch 25 operated by the coil 21 is connected across the switch 7. Switch 7 and reed swith 25 are normally open and resert switch 22 is normally closed. On operation of switch 7 coil 21 and light 24 are energised, coil 21 closing reed switch 25. Therefore switch 7 is opened the warning light circuit will remain energised since reed switch 25 remains closed under the influence of coil 21. The warning light can only be turned off by manual operation of reset button 22 which breaks the circuit and allows reed switch 25 to open. The reset button 22 can be combined with lamp 24 in such a way that when the lamp is lit it can be extinguished by pushing it into its socket. Other forms of self-energising circuits can be used, circuits including a zener diode for example.

Figure 2:
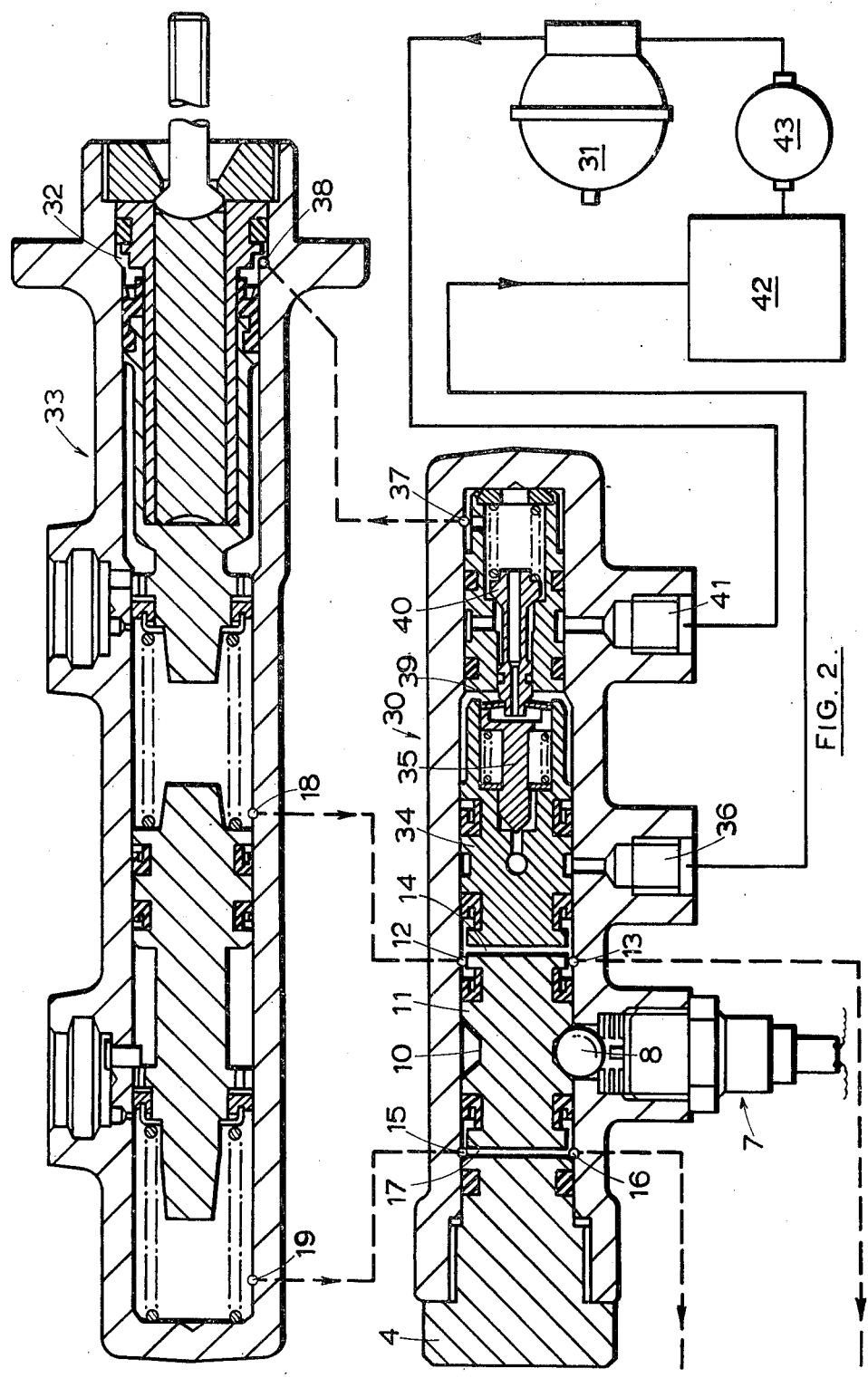
FIGS. 2 and 3 show a detector unit included in power-assisted master cylinder assemblies.

In FIG. 2 the detector unit is included in a control valve assembly 30 controlling hydraulic fluid from an accumulator 31 to the power chamber 32 of a power-assisted tandem hydrostatic master cylinder 33. In this arrangement the chamber 14 is defined between piston 11 and a control piston 34 which actuates an exhaust valve 35 controlling flow between exhaust port 36 and outlet 37 connected to inlet 38 of power chamber 32. The exhaust valve is resiliently connected by a Belleville washer 39 to an inlet valve 40 controlling flow between an inlet port 41 and outlet 37. Exhaust port 36 is connected to reservoir 42 for the pump 43 supplying accumulator 31 which is connected to inlet port 41.

Figure 3:
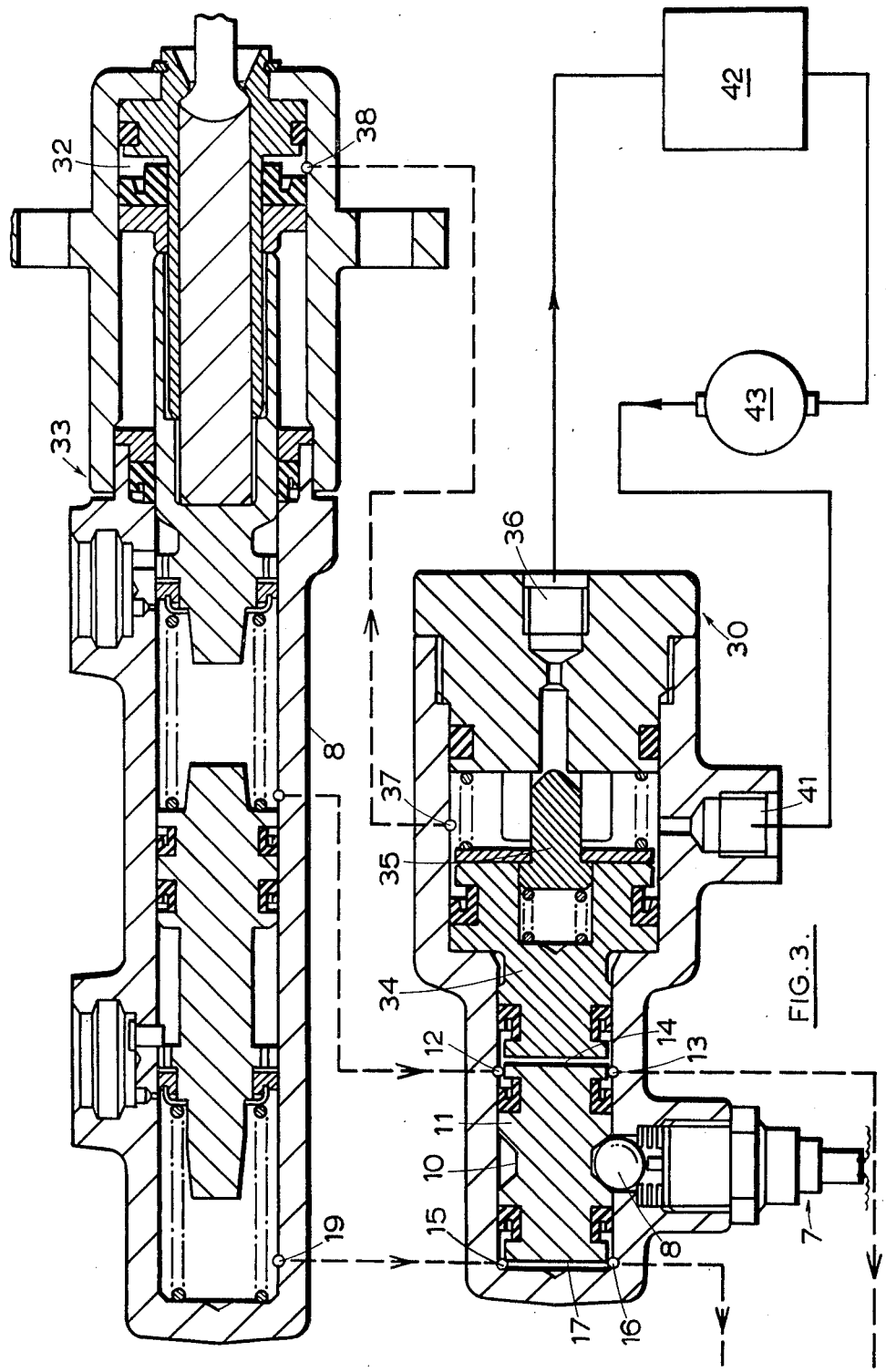

In FIG. 3 the arrangement is substantially the same except that the control valve assembly 30 has been modified to control an open centre hydraulic supply instead of a closed centre supply as in FIG. 2. This means that the inlet valve 40 can be dispensed with.

Operation of the detector unit in the assemblies of FIGS. 2 and 3 is as described with reference to FIG. 1. It will be noted that, on failure of the primary brake circuit applied from outlet 18 control piston 34 will be actuated by piston 11. Thus, piston 11 performs the dual function of keeping the brake circuits separate, yet allowing pressure in either circuit to operate the booster valve.

A differential pressure detector as described is not only useful for dual braking systems but also between any two circuits of a triple or other multiple circuit system.

What is claimed is:

1. Means for detecting a difference in pressure between two hydraulic circuits, said detecting means comprising a piston movable in a cylinder, each end of said piston being exposed to fluid in a chamber defined in said cylinder, and said piston being provided with a substantially circumferentially extending groove in the outer surface thereof, connecting means to connect each chamber to one of said hydraulic circuits, indicating means, an actuating member for said indicating means and having a portion located in said groove, the cross-sectional profile of said groove being such that axial movement of said piston causes said actuating member to be displaced to actuate said indicating means, and limiting means for limiting axial movement of said piston to prevent said portion of said actuating member being disengaged from said groove.

2. Detecting means as in claim 1 wherein the actuating member is a ball received in said groove in said piston, and the sides of said groove are inclined in opposite directions for displacing said ball to actuate said indicating means, said ball being spring-loaded towards said piston and serving to centre said piston.

3. Detecting means as in claim 1 wherein said limiting means comprises stops arranged in said cylinder at each end of said piston to limit axial movement of said piston.

4. Detecting means as in claim 1 wherein said indicating means comprises an electrical switch which is operated by said actuating member, and a self-energising indicating circuit including said swtich.

5. Detecting means as in claim 4 wherein said indicating circuit includes a manual reset switch for de-energising said indicating circuit.

6. Detecting means as in claim 1, wherein said limiting means comprises opposite end walls defining opposite ends of a bore in said cylinder in which said piston works, and said end walls are adapted to be engaged by adjacent ends of said piston, the axial spacing between said end walls and the length of said piston being so chosen that said portion of said actuator member cannot become disengaged from said groove.

* * * * *